United States Patent
De et al.

(10) Patent No.: US 7,580,819 B2
(45) Date of Patent: Aug. 25, 2009

(54) ADAPTIVE MISSION PROFILING

(75) Inventors: Piali De, Harvard, MA (US); John E. Rannenberg, N. Kingstown, RI (US)

(73) Assignee: Raytheon Company, Waltham, MA (US)

( * ) Notice: Subject to any disclaimer, the term of this patent is extended or adjusted under 35 U.S.C. 154(b) by 550 days.

(21) Appl. No.: 11/392,222

(22) Filed: Mar. 28, 2006

(65) Prior Publication Data

US 2007/0113235 A1    May 17, 2007

Related U.S. Application Data

(63) Continuation-in-part of application No. 11/265,802, filed on Nov. 1, 2005.

(51) Int. Cl.
*G06F 9/455* (2006.01)
(52) U.S. Cl. .................. 703/6; 700/99; 705/7
(58) Field of Classification Search .......... 703/6, 703/7; 705/1, 7, 9; 700/99; 324/511; 434/43; 701/24, 23; 706/50; 711/136; 702/109; 342/59
See application file for complete search history.

(56) References Cited

U.S. PATENT DOCUMENTS

| | | | | |
|---|---|---|---|---|
| 4,584,578 | A | 4/1986 | Brauns et al. | 343/5 |
| 6,122,572 | A | 9/2000 | Yavnai | 701/23 |
| 6,816,800 | B2 | 11/2004 | Heiland | 702/109 |
| 2003/0149610 | A1 | 8/2003 | Rowan et al. | |
| 2003/0190589 | A1* | 10/2003 | Lechner | 434/43 |
| 2003/0213358 | A1 | 11/2003 | Harding | |
| 2004/0015375 | A1 | 1/2004 | Cogliandro | |
| 2004/0267395 | A1* | 12/2004 | Discenzo et al. | 700/99 |
| 2005/0004723 | A1* | 1/2005 | Duggan et al. | 701/24 |
| 2005/0197991 | A1 | 9/2005 | Wray et al. | 706/50 |
| 2005/0212523 | A1* | 9/2005 | Chang et al. | 324/511 |
| 2006/0229921 | A1* | 10/2006 | Colbeck | 705/7 |
| 2006/0229926 | A1* | 10/2006 | Homann et al. | 705/9 |
| 2006/0235707 | A1* | 10/2006 | Goldstein et al. | 705/1 |
| 2007/0074182 | A1 | 3/2007 | Hinchey et al. | 717/136 |

FOREIGN PATENT DOCUMENTS

WO    WO 03/083800 A1    10/2003

OTHER PUBLICATIONS

Notification of transmittal of the International Search Report and the Written Opinion of the International Searching Authority, or the Declaration. (Form PCT/ISA/220), dated Feb. 13, 2007.
International Search Report. (Form PCT/ISA/210).

(Continued)

*Primary Examiner*—Paul L Rodriguez
*Assistant Examiner*—Kandasamy Thangavelu
(74) *Attorney, Agent, or Firm*—Daly, Crowley, Mofford & Durkee, LLP

(57) ABSTRACT

In one aspect, the invention is a method for adaptive mission profiling. The method includes integrating mission components used in a mission and associating the mission components to metadata. The method also includes transferring messages from the mission components and determining a status of the mission based on the messages and the metadata.

34 Claims, 6 Drawing Sheets

OTHER PUBLICATIONS

Written Opinion of the International Searching Authority. (Form PCT/ISA/237).

Lin Zhang, et al.,"A Coloured Petri Net based Tool for Course of Action Development and Analysis", ACM International Conference Proceeding Series, XP002417643, vol. 145, 2002, pp. 125-134.

Huei Wan Ang, et al.,"Improving the Practice of DoD Architecting with the Architecture Specification Model", XP002417644, [Online] Jun. 2002, The Mitre Corporation, 10 pages, http://www.mitre.org/work/tech_papers/tech_papers_05/05_0423/05_0423.pdf>.

Bondavalli A., et al., "DEEM: A Tool For The Dependability Modeling and Evaluation of Multiple Phased Systems", Proceedings International Conf. on Dependable Systems and Networks, XP000988657, IEEE Comp. Soc, US, Jun. 25, 2000, pp. 231-236.

Wagenhals, L.W., et al., "Creating Executable Models of Influence Nets with Colored Petri Nets", XP002417645, Int'l Journal on Software Tools for Technology Transfer, Springer-Verlag, Germany, vol. 2, No. 2, Dec. 1998, pp. 168-181.

Mura, Ivan, et al. "Hierarchical Modeling & Evaluation of Phased-Mission Systems", XP002417646, IEEE Transactions on Reliability, 1999, vol. 48, No. 4, pp. 360-368.

Kristensen, et al. "Application of Coloured Petri Nets in System Development", XP019007958, vol. 3098, 2004, pp. 626-685.

Piali De et al., "Design and Analysis of Integrated Fires in a Future Mission", Briefing to National Fire Control Synposium, Orlando, Florida, Jul. 25-28, 2005, 21 pages.

File downloaded from Pair for U.S. Appl. No. 12/120,280, filed May 14, 2008, file through Jan. 7, 2009, 76 pages.

Notification of Transmittal of the International Search Report and the Written Opinion of the International Searching Authority, or the Declaration , PCT/US2008/063673 dated Dec. 22, 2008.

Notification Concerning Transmittal of International Preliminary Report on Patentability (Chapter 1 of the Patent Cooperation Treaty); PCT/US2007/005741 dated Jan. 22, 2009.

Notification of Transmittal of the International Search Report and the Written Opinion of the International Searching Authority, or the Declaration, PCT/US 07/05741 dated Nov. 25, 2008.

File downloaded from Pair for U.S. Appl. No. 11/265,802, filed Nov. 1, 2005, file through Dec. 30, 2008, 578 pages.

International Preliminary Report on Patentability (Form PCT/IB/373) and Written Opinion (Form PCT/ISA/237) for PCT/US2006/040355, dated May 15, 2008, 10 pages.

David Wallace, "Language use in a branching Universe", Balliol College, Oxford, U.K., Dec. 2005, 21 pages.

Kuter, et al., "Interactive Planning under Uncertainty with Causal Modeling and Analysis", Univ. Of Maryland, Dept. Of Computer Science; Rome Laboratory, 2003, 8 pages.

Amant et al., "Data Analysis Assistance for Interactive Planning", North Carolina State University, Dept. Of Computer Science, 2000, 8 pages.

Lumbo, Master of Science in Organizational Dynamics Theses, Applications of Interactive Planning Methodology, Submitted to the Program of Organizational Dynamics, Univ. Of Pennsylvania, 2007, 72 pages.

Ambite, et al., "Getting from Here to There: Interactive Planning and Agent Execution for Optimizing Travel", 2002, 8 pages.

Kuter, et al., "Interactive Course-of-Action Planning Using Causal Models", Proceedings of the Third Int'l Conf. On Knowledge Systems for Coalition Operations (Ksco-2004), Oct. 2004 (postponed), 12 pages.

Gary Borchardt, "Interactive Planning and Monitoring" Artificial Intelligence Laboratory, Mass Inst. of Tech., http://www.ai.mit.edu 2000, pp. 205-206.

Perini et al., "An Interactive Planning Architecture, the Forest Fire Fighting case", I.R.S.T., povo, Italy, 1996, 11 pages.

Kim, et al., "A Planner Independent Approach to Human Interactive Planning", Univ. of So. California and Inst. For Creative Technologies, Aug. 9, 2003, 18 pages.

Weir, "Learning From a Plan-Based Interface", Comput. Educ., vol. 12, No. 1, pp. 247-251, 1988.

Ferguson et al., "TRIPS: An Integrated Intelligent Problem-Solving Assistant", Univ. of Rochester, dept. of Computer Science, 1998, American Assoc. for Artificial Inteligence, (www.aaai.org), 6 pages.

Anderson, et al., "An Integrated Theory of the Mind", Psychological Review, 2004, vol. 111, No. 4, pp. 1036-1060.

Act-R, "About Act-R", http://act-r.psv.cmu.edu/about/, Dept. Of Psychology, Carnegie Mellon Univ., webmaster@act-r.psy.cmu.ed, printout dated Oct. 31, 2008, 4 pages.

Honing, et al. "The Taems White Paper", Univ. Of Mass., Amherst, Ma, 2005, 6 pages.

Notification Concerning Transmittal of International Preliminary Report on Patentability (Chapter 1 of the Patent Cooperation Treaty); PCT/US2007/005741 dated Jan. 22, 2009.

Perini et al., "An Interactive Planning Architecture, the Forest Fire Fighting case", I.R.S.T., Povo, Italy, 1995, 11 pages.

Horling, et al. "The Taems White Paper", Univ. Of Mass., Amherst, MA, 1999, 6 pages.

* cited by examiner

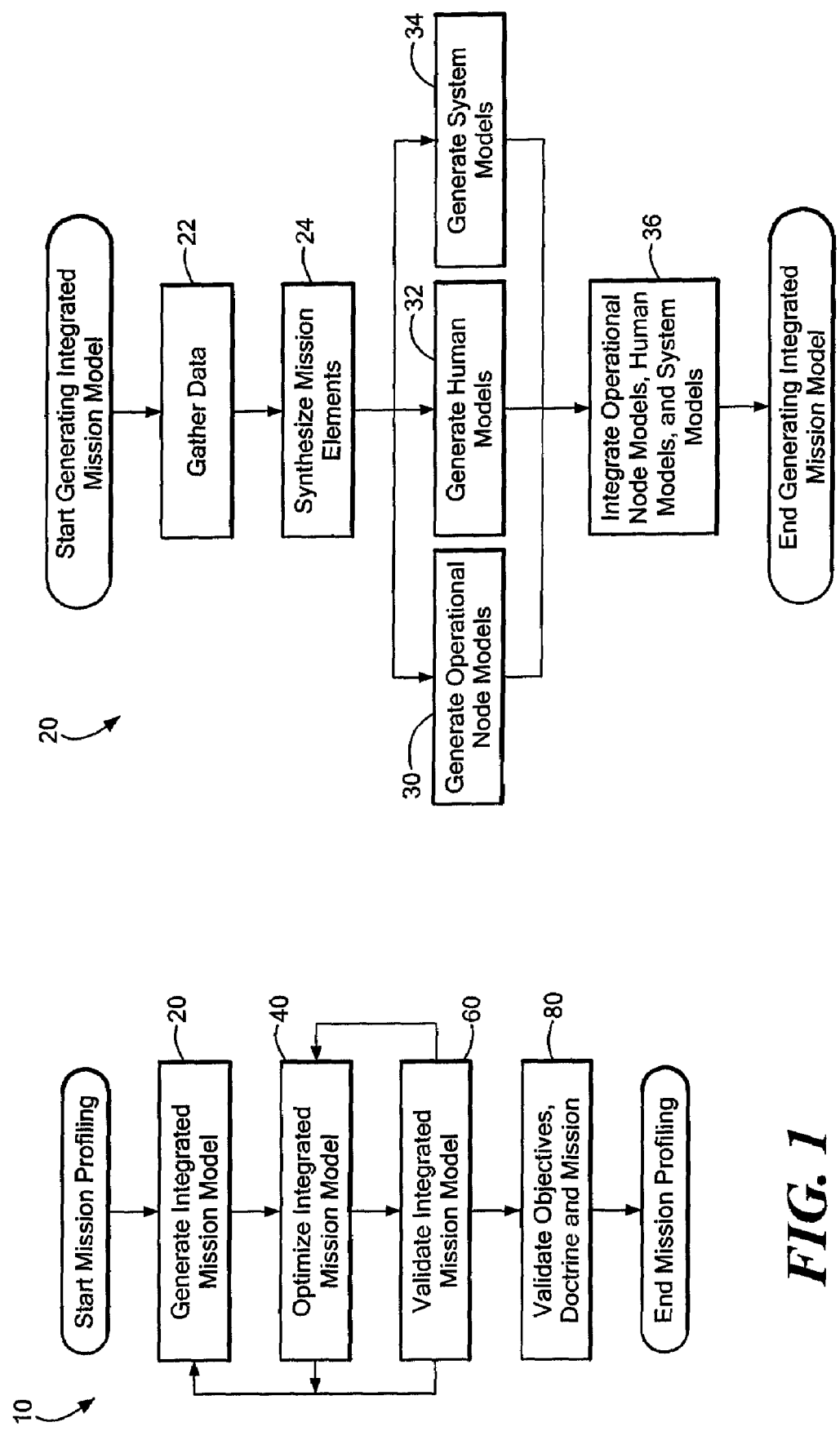

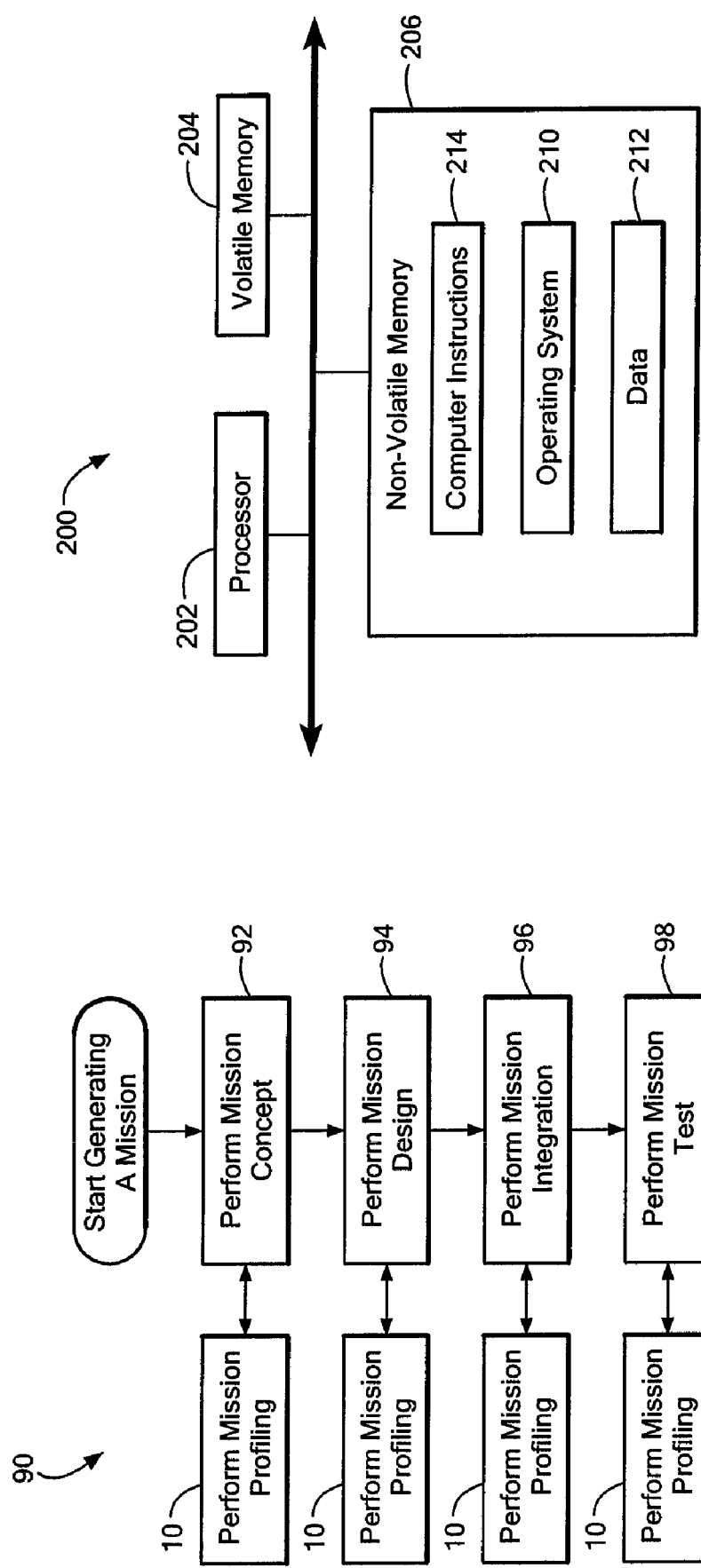

ADAPTIVE MISSION PROFILING

RELATED APPLICATIONS

This patent application claims priority to and is a continuation-in-part to application Ser. No. 11/265,802, filed Nov. 1, 2005 entitled "MISSION PROFILING" which is incorporated herein in its entirety.

TECHNICAL FIELD

This invention relates generally to mission and system design and optimization and more specifically to mission profiling.

BACKGROUND

There have been a number of methods and technologies directed to improving performance and efficiency of an organization to achieve their goals. Some of these methods and technologies have been implemented into systems, for example, a Systems Engineering V (SE V) model. Benjamin Blanchard's work in systems engineering described the general process steps associated with the SE V model, from requirements design through system descriptions and functional descriptions to system design and validation. Other technologies and methods include a Business Process Re-Engineering (BPR) model by Michael Hammer and others, which maps processes in a linear fashion by observing inputs and outputs and observing duplicative efforts within an enterprise. Further technologies include the Integrated Computer-Aided Manufacturing (ICAM) Definition Languages (IDEF) Modeling technique developed by the United States Air Force. Still other technologies that improve performance and efficiency of the organization include RATIONAL ROSE REALTIME®), RHAPSODY®, Extend and other graphical tools.

SUMMARY

In one aspect, the invention is a method for adaptive mission profiling. The method includes integrating mission components used in a mission and associating the mission components to metadata. The method also includes transferring messages from the mission components and determining a status of the mission based on the messages and the metadata.

In another aspect, the invention is an apparatus for adaptive mission profiling. The apparatus includes circuitry to integrate mission components used in a mission, associate the mission components to metadata, transfer messages from the mission components and determine a status of the mission based on the messages and the metadata.

In another aspect, the invention is an article including a machine-readable medium that stores executable instructions for adaptive mission profiling. The executable instructions cause a machine to integrate mission components used in a mission, associate the mission components to metadata, transfer messages from the mission components and determine a status of the mission based on the messages and the metadata.

In a still further aspect, the invention is an adaptive mission profiler system. The system includes a mission component representing a mission entity, a messaging infrastructure to receive messages from the mission component and a metadata database having metadata. The system also includes an intelligent agent integrating the mission component to the messaging infrastructure. The intelligent agent simulates realistic communication of messages between the mission component and the messaging infrastructure. The system further includes a sentinel agent to receive messages from the mission components. The sentinel agent determines in real-time a status of the mission based on the messages and the metadata database.

DESCRIPTION OF THE DRAWINGS

FIG. 1 is a flowchart of a process for mission profiling.

FIG. 2 is a flowchart of a process for generating an integrated mission model.

FIG. 5 is a flowchart of a process for generating a mission.

FIG. 6 is a block diagram of a computer system on which the integrated mission model may be implemented.

DETAILED DESCRIPTION

Figure 4:
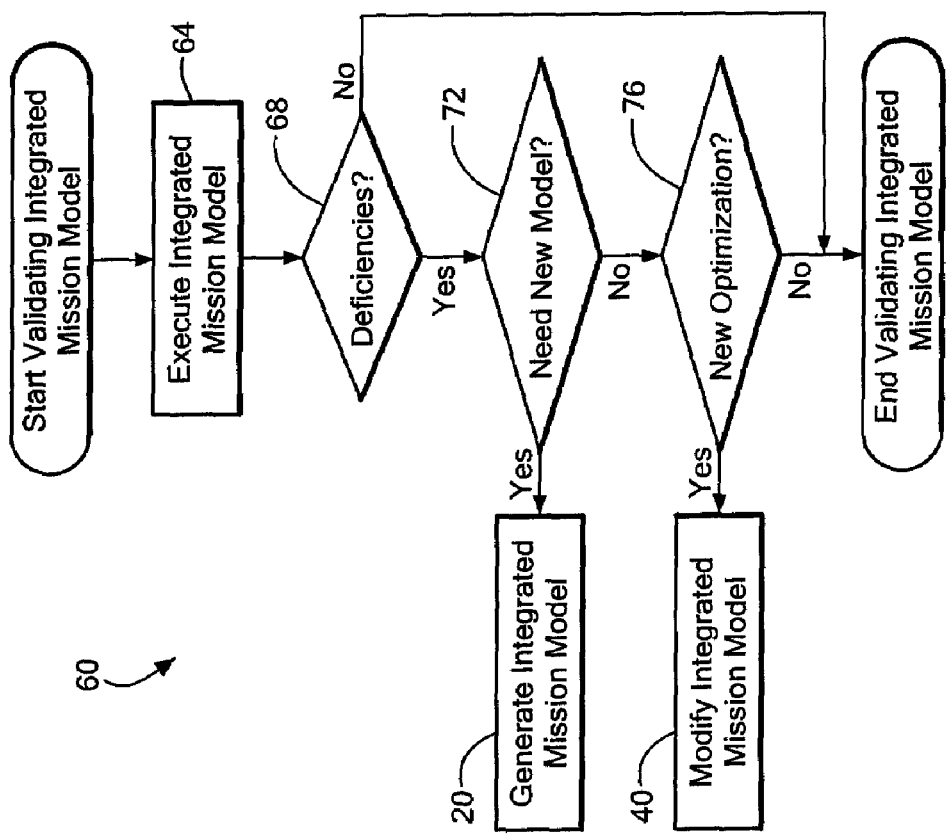
FIG. 4 is a flowchart of a process for validating the integrated mission model.

Mission profiling is a process which defines, optimizes, and validates doctrines, objectives and missions, as well as processes and systems, sub-systems and operations that support the missions. A doctrine is a set of fundamental principles, which guide the actions of persons in support of objectives. The objectives are goals that organizations would like to achieve or maintain. For example, one objective for a corporation, sometimes called a vision, is to have world-class customer service. A mission is a set of tasks, together with a purpose, which indicates the action to be taken and the reason for performing the task to achieve the objective. Missions are ultimately in support of the objective. A mission may include one or more activities and/or one or more systems for achieving a particular outcome. Thus, missions are tasks for achieving the objective while adhering to a doctrine.

Historically, systems have been designed to perform to a set of requirements, but not specifically designed to accomplish a particular mission. For example, a system, such as an aircraft weapons system, is designed to fly at a certain speed and deliver a certain payload to a target, but the design of the aircraft may not meet a particular mission need. Included herein is a novel approach to mission profiling that integrates people and systems at all levels to ensure that each person and system functions together in order to accomplish the mission.

The mission profiling process described herein may be implemented with the Department of Defense Architecture Framework (DODAF) used by the United States military. The process uses DODAF framework products as inputs to the mission profiling process. The DODAF provides the basis for developing and presenting architecture descriptions in a uniform and consistent manner. A purpose of the DODAF is to ensure that architecture descriptions developed by DOD commands, services and agencies contain applicable views such as all views (AVs), operational views (OVs), system views (SVs), and technical standard views (TVs), and that the architecture descriptions may be compared and related across organizational boundaries, e.g., joint military commands, multi-national forces, and so forth. To accomplish this, the DODAF defines framework products to capture specific architectural views. The standard DODAF products include two AVs, nine OVs, thirteen SVs, and two TVs. While a DODAF may be used herein, the inputs for the mission profiling process may come from any source and is not limited to DODAF framework products. Mission profiling process inputs may include a corporate vision and mission statements, project financial and performance goals, policy and procedural manuals, process diagrams and process manuals, subject matter expert interviews, flowcharts and both written and verbal methods for business processes.

Referring to FIGS. 1 and 2, process 10 is an exemplary process for mission profiling. Process 10 generates an integrated mission model using a subprocess 20. Subprocess 20 gathers data (22). For example, one or more customer interaction meetings are conducted to gather information from an organization to determine their objectives, doctrine and mission. The information may come directly from documents, such as organizational literature or flow charts, or the information may be derived from interviews such as interviews conducted by subject matter experts, for example, or both through documents and interviews. In one example, the information may be obtained from a Concept of Operations (CONOPS) document. In another example, as will be described herein, gathering data (22) may also include information learned or data generated from optimizing the integrated mission model (40) and/or from validating (60) the integrated mission model.

Subprocess 20 synthesizes mission elements from the gathered data (24). Mission elements may include operational nodes, humans and systems, which will perform the mission. For example, synthesizing mission elements may include identifying operational nodes, humans and systems and their respective functions. For example, operation views, such has DODAF Operational Node Connectivity Description (OV-2) and Operational Information Exchange Matrix (OV-3), and activity-based models, such as DODAF Operational Activity Model (OV-5), are reviewed to yield details on the mission descriptions. OV-2 includes operational nodes along with connectivity and information exchange lines between nodes. An operational node may represent an organization involved with the mission, for example, people, systems or a combination thereof. OV-3 includes information exchanges between nodes and relevant attributes of that exchange. Relevant attributes typically focus on the specific aspects of the information flow and the information content. For example, performance attributes may include timeliness and periodicity. In another example, security attributes may include accountability, protection and classification. OV-5 includes capabilities (system functions), operational activities, relationships among activities, input and outputs. OV-5 may also include cost, performing nodes or other pertinent information.

Subprocess 20 generates operational node models (30). For example, generating operational node models may include generating a Colored Petri Net (CPN) model of the operational activities and data that define a mission. The CPN model, or other actionable representation, for an operation node depicts the operational activities that may occur in a node, with associated information inputs and outputs. The operational node models may be developed with varying degrees of fidelity. An example of an operational node is a Marine Corps infantry battalion Fire Support Coordination Center (FSCC). Included in its model are the activities (along with inputs and outputs) that are performed inside that FSCC. For example, "Approve Call for Fire" is a relatively high-level operational activity, which may be sufficient in some mission models. However, if necessary, "Approve Call for Fire" may be further decomposed to lower-level operational activities, such a Process Request for Fire Message, Plot Target Location Consult with Commander's Guidance, Evaluate Weapon Status Approve Request. In another example, a financial institution includes a high level operational activity of check clearance. Check clearance is comprised of several lower level operational activities including key entry, account validation, account reconciliation, and so forth.

A separate operational node model may be generated for each operational node in the mission. The CPN model for each operational node may be re-used in any mission model, since the sequencing of activities within a node and in between nodes may be mission specific and not in the operational node model. Instead, the sequencing may be separately modeled, for example, during integrating human, system and operational node models (36).

In one example, the inputs for generating an operation node may include information obtained using DODAF OV-2, OV-3, OV-5 products or any operational framework.

System descriptors are used to identify the systems and communication methods that are used within each operational node. Systems are described in terms of the functions that they can perform with associated inputs and outputs. For instance, a fire control system will perform the function of prioritizing targets for which the fire control system needs to know various target characteristics, this body of data is the system descriptor. The financial institution automated check clearing system is identified at a high level so that the financial institution automated check clearing system can communicate with other systems. On a lower level the financial institution automated check clearing system relies on several inputs and produces two outputs. The inputs may include check type, financial institution code, account code, transaction amount, and so on. The outputs include "approved" or "declined". For example, system descriptors may be obtained from DODAF System Interface Description (SV-1) and Systems Communication Description (SV-2). SV-1 includes identification of system nodes, systems, and system items and their interconnections within and between system nodes. System nodes are systems used to accomplish the mission. SV-2 includes system nodes, systems and system items, and their related communication architectures. An architecture defines "who" can communicate with "whom" and through "what" device.

The operational activities may be partitioned into those operational activities supported by systems and those operational activities supported by humans. For example, the information used for partitioning may be obtained from DODAF Operational Activity to Systems Function Traceability (SV-5). SV-5 includes mapping of system functions to operational activities. The operational node models may be validated to determine that it is a proper representation.

Subprocess 20 generates human models (32). With the partitioning of the operational activities into system functions and human activities, the human models for individual or groups of people are generated that support an operational node. The human model represents the human activities, the triggers for a human activity and the outputs from the human activities. For example, the human activities information may be obtained from DODAF Organizational Relationships Chart (OV-4). OV-4 includes organizational role or other relationships among organizations. Human activities may be obtained through an interview process, or a combination of documentation review and interviews.

In one example, the human models are represented as CPN models, which may be re-used with other missions. The human models may also be represented by intelligent agents

Figure 7:
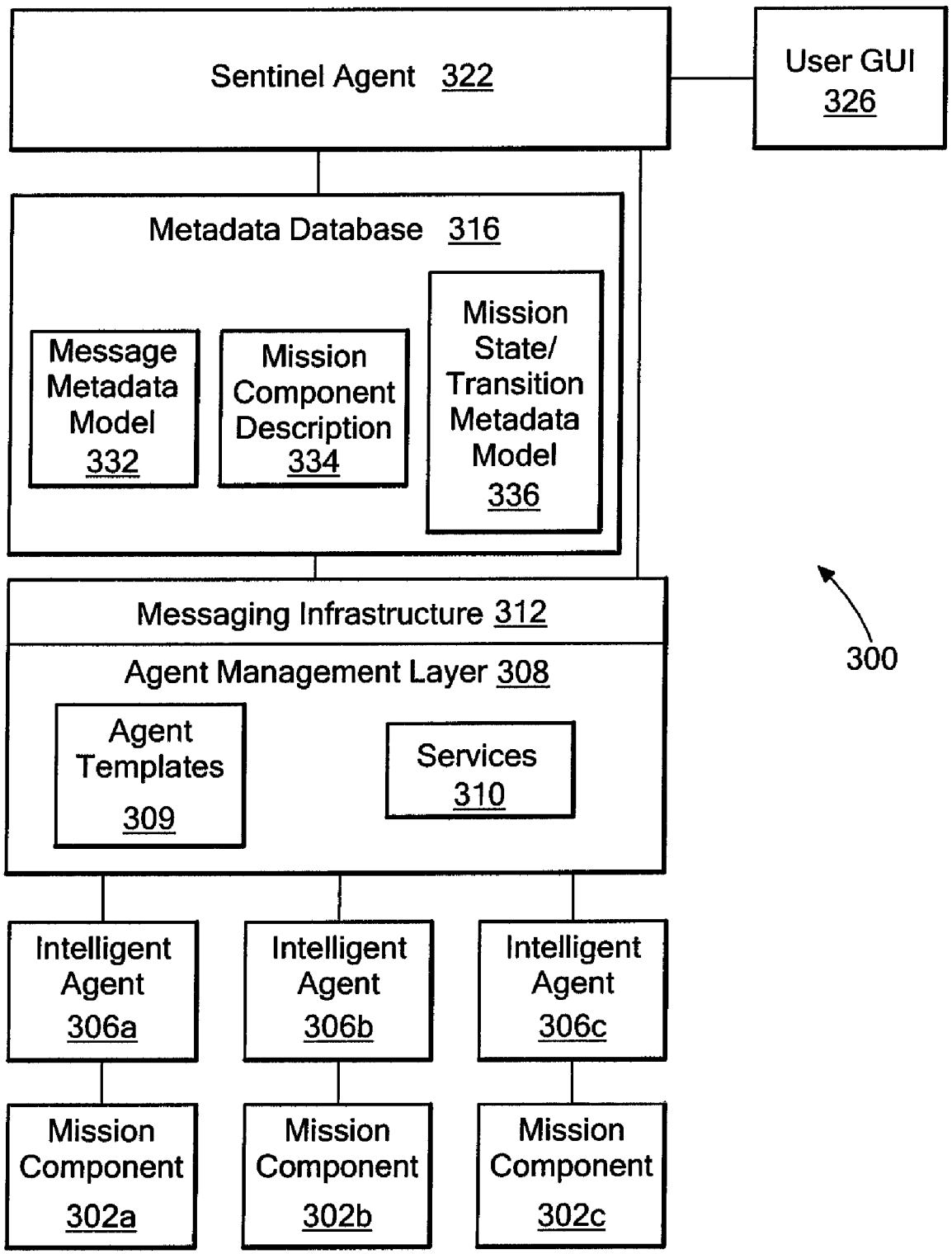
FIG. 7 is a block diagram of an adaptive mission profiler system.

306 (FIG. 7). Furthermore, real people may be represented and be linked to the mission profiling via their corresponding intelligent agent 306 (FIG. 7). The human models may be validated to determine that they are proper representations, for example, by showing the human models to mission planners.

Subprocess 20 generates system models (34). For each system that supports the mission operation, a CPN model of the system functions provided by the system is generated, which includes inputs and outputs. In one example, DODAF System Functionality Description (SV-4) may provide a baseline for generating the systems models. SV-4 includes functions performed by systems and system data flows among system functions.

System models may be developed with varying degrees of fidelity. For example, in some cases it may be important to identify a system function based on its inputs and outputs to verify interoperability with other systems. In other cases, it may be necessary to model a level of system functionality to facilitate performance modeling.

In one example, the system models are represented as CPN models, which may be re-used with other missions. In another example, system models may be represented by physics-based simulations. In another example, system functions are provided by real systems. The integration of the system functionality is performed by intelligent agents 306 (FIG. 7) which may adapted to representations of varying fidelity. The system models may be validated to determine that they are proper representations, for example, by showing the system models to mission planners. Subprocess 20 integrates the operational node models, the human models and the system models to form an integrated mission model (36). Human activities are mapped with corresponding system functions. The mapping includes synchronizing the human activities with the system functions. Human activities and system functions are mapped to operational activities. The mapping includes synchronizing the human activities and system functions with the operational activities. For example, DODAF SV-5 may be used for mapping system functions and human activities to operational activities.

The models (human, system and operational node) may be replaced in the integrated mission model by actual entities that they represent. For example, a human model may be replaced by human actions (e.g., receiving signals from a mouse controlled by a human), a system model may be replaced by an actual system such as a camera and an operational node model may be replaced by an organization.

Figure 3:
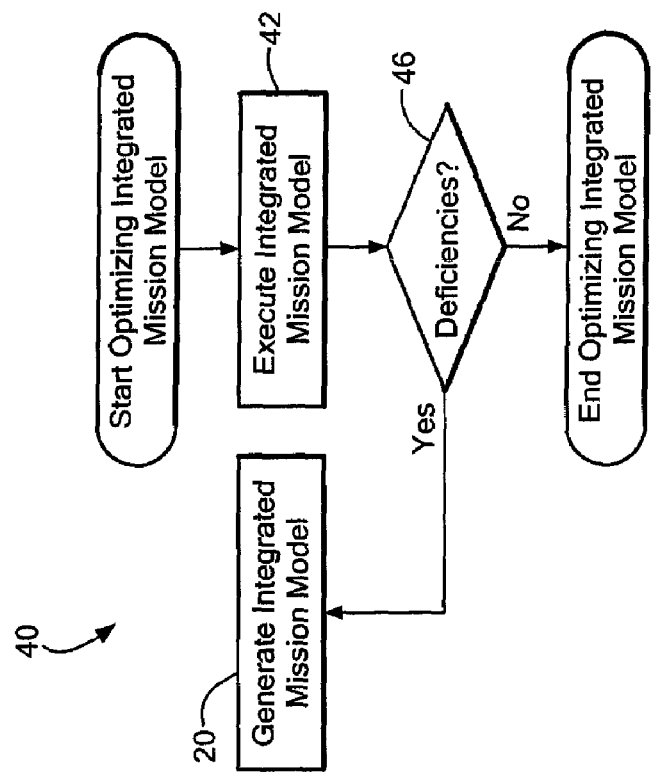
FIG. 3 is a flowchart of a process for optimizing the integrated mission model.

Referring to FIGS. 1 and 3, process 10 optimizes the integrated process centric mission model using a subprocess 40. Subprocess 40 executes the integrated process centric mission model (42). Subprocess process 40 determines if there are any deficiencies with the integrated model (46). For example, the deficiencies may be bottlenecks, timing issues, sequence issues, and improper logic breaks. Other deficiencies may be determined from performance characteristics of the mission, such as measures of performance linked to the objective. For example, a deficiency may found if the integrated model does not execute or executes improperly because human activities are not properly aligned with operational activities or supported by requisite systems. For instance, military transport aircraft are expected to carry an operations battalion into a battlefield environment, but executing the integrated mission model indicates that it would take three military aircraft to execute the mission. Using two transport aircraft would improve efficiency by reducing the number of fighter support required during stages of the mission but leave the mission in a deficient state not immediately apparent without the analysis provided by the integrated model. In another example, the human activities indicate that the operations battalion carries additional communications equipment not accounted for in an operations deployment document because the communications equipment is typically pre-deployed by a covert reconnaissance team. Eliminating the communications equipment from being transported would reduce the number of aircraft from three to two, and increasing efficiency and reducing risk of detection and loss of aircraft. Thus, by optimizing the integrated mission model in this example, unnecessary duplicative activities are indicated and may be removed to improve efficiency. If there are deficiencies with the integrated model, subprocess 40 returns to generating the integrated mission module (20).

Referring to FIGS. 1 and 4, process 10 validates the integrated mission module by using a subprocess 60. Subprocess 60 executes the integrated mission module (64). Live or simulated data may be inputted into the integrated mission module. Subprocess process 60 determines if there are any deficiencies with the integrated model (68). For example, it was expected that a particular temporary airfield in the jungle should do fifty flight sorties in a day, but simulations on the integrated mission model indicated that the actual performance will be forty sorties a day thereby indicating a deficiency After analyzing the integrated mission module to determine the activities required during an air sortie, it is determined that a deficiency exists in an aircraft maintenance manual. After investigation, it was determined that that the aircraft maintenance manual required lengthy fuel inspections of each aircraft for fuel leaks. The inspection of leaks was required only for cold weather environments, but that requirement was never pointed out in the manual (and therefore modeled accordingly). Thus, by using the integrated mission module, deficiencies in systems, operations activities and human activities are easily identified. In other examples, training, facilities or management decisions may be modified to ensure that mission expectations are met.

If there are deficiencies, subprocess 60 determines if a new integration model is needed (72). If a new integration model is needed, subprocess 60 returns to generating the integrated mission module (20). If a new integration model is not needed, subprocess 60 determines if further optimization is needed. If further optimization model is needed, subprocess 60 returns to optimizing the integrated mission module (40).

Referring back to FIG. 1, process 1O validates the objectives, doctrine and mission (80). For example, it is determined that the integration model functions properly; however, the performance continues to fall short of mission expectations. For example, the mission goal of disabling a tank division by using an artillery unit is expected to be two hours, but the integrated mission module indicates that it will take four hours, because the artillery guns fire insufficient number of rounds in an hour. Until newer guns are designed and acquired, the expectations cannot be met and so the mission goal is changed or other work-arounds are designed into the mission. In other examples, training, facilities or management decisions may be modified to account for not meeting or exceeding mission expectations.

The mission profiling process 10 emphasizes an iterative process, which improves the understanding of the mission to a mission planner, allows for a better representation of the mission and manages the mission planner's expectations of actual mission results.

The mission profiling process 10 allows for analysis of complex missions that involve multiple, asynchronous and concurrent events. The mission profiling process 10 mitigates problems associated with stand-alone systems development that lead to integration issues in meeting mission needs. By modeling the overall mission profiling process and decision points, integration issues are mitigated. Typical integration issues and problems such as bottlenecks, breaks in logic or functional flow and sub-optimal decision paths are found between systems, sub-systems and people implementing the mission. These problems and discontinuities are discovered and mitigated before final system design.

The mission profiling process 10 may be used throughout the mission development lifecycle, which allows for the optimization of the mission in relationship to its goals at each step of the mission development process. The mission profiling process may be used iteratively, and may be run multiple times with or without all variables being intact, so that various scenarios and dependencies may be viewed, analyzed and optimized, ultimately validating a range of mission inputs; from the goals of the top level doctrine all the way down to the sub-systems and humans and training of humans that support that doctrine.

The mission profiling process 10 provides feedback, performance metrics and data on the resulting outcome of the doctrine, vision and mission as currently designed to determine their effectiveness. In a war related test of doctrine, a simulated feedback may save lives and resources. In a business related test of doctrine and vision, a simulated feedback may improve financial performance strategic formulation and market acceptance for example.

The mission profiling process may be iterative and may follow a mission and/or system development though an entire lifecycle, from conceptual inception through fielding and support and retirement. At each step along the lifecycle, various representations of both humans and systems may be replaced by real humans or systems or improved representations for a higher fidelity mission profile. The fidelity of the model may increase as more is learned about a system as the system goes from conceptual design, to final design, to fielding and so forth. These newer representations may be integrated into the integrated mission model at any time, and the integrated mission model may be re-run for new measures of performance.

Referring to FIG. 5, mission profiling process 10 may be used also to generate a mission. For example, an exemplary process for generating a mission uses a process 90. Process 90 performs a mission concept (92). For example, the mission elements and the interactions (mapping) between the mission elements are selected by a mission planner. Process 90 performs mission profiling (10). In one example, mission profiling 10 is performed iteratively to enable a planner to decide whether, for example, the proper mission elements are included and their interactions are acceptable.

Process 90 performs a mission design (94). For example, the interactions (mapping) between the mission elements are fixed. Process 90 performs mission profiling (10). In one example, mission profiling (10) is performed iteratively to enable a planner to decide whether, for example, the proper mission elements are included and their interactions are acceptable.

Process 90 performs a mission integration (96). For example, some of the mission elements are fixed. Process 90 performs mission profiling (10). In one example, mission profiling (10) is performed iteratively so that over time all or most of the mission elements become fixed.

Process 90 performs a mission test (98). Process 90 performs mission profiling (10). In one example, mission profiling 10 is performed iteratively to enable a planner to decide whether, for example, the mission meets a mission planner's expectations.

FIG. 6 shows a computer 200 for executing an integrated mission module. Computer 200 includes a processor 202, a volatile memory 204 and a non-volatile memory 206 (e.g., a hard disk). Non-volatile memory 206 stores operating system 210, data 212 for storing the integrated mission module, and computer instructions 214, which are executed by processor 202 out of memory 204 to execute the integrated mission module. In other examples, mission profiling may be enacted on multiple computers connected by a messaging infrastructure.

The integrated mission module is not limited to use with the hardware and software of FIG. 6; it may find applicability in any manual, visual or computing or processing environment and with any type of medium or machine that is capable of running the models or a computer program. The integrated mission module may be implemented in hardware, software, or a combination of the two. The integrated mission module may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the integrated mission module and to generate output information.

The integrated mission module may be implemented, at least in part, via any computer program product, i.e., a computer program tangibly embodied, e.g., in a machine-readable storage device, for execution by, or to control the operation of, data processing apparatus, e.g., a programmable processor, a computer, or multiple computers. Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the integrated mission module.

The integrated mission module may be performed by one or more programmable processors executing one or more computer programs to perform the functions of the system. All or part of the system may be implemented as, special purpose logic circuitry, e.g., an FPGA (field programmable gate array) and/or an ASIC (application-specific integrated circuit).

The output of the mission profiling process may be numerical, in the case of performance to a doctrinal goal, or graphical or auditory, electronic or a combination of these with the purpose of assisting doctrinal, vision and mission design decisions by a person or group of people.

Referring to FIG. 7, the mission profiling processes described above may be implemented in an adaptive mission profiler system (AMPS) 300. Typically, previous mission analysis systems included one path from a start of a mission to an end of the mission. Generally, the path was scripted by these previous mission analysis systems. Using the techniques described above, the AMPS 300 is an adaptive system that allows for an unbounded number of paths from the start to the end of mission so that a user of AMPS 300 may analyze any path in order to choose a single path desired by the user. As will be shown below, the AMPS 300 provides realism to a mission and provides real-time mission analysis in order to satisfactorily measure an effectiveness of a mission.

The AMPS 300 includes mission components 302 (e.g., a mission component 302a, a mission component 302b and a mission component 302c), intelligent agents 306 (e.g., an intelligent agent 306a, an intelligent agent 306b and an intelligent agent 306c), an agent management layer 308, a messaging infrastructure 312, a metadata database 316, a sentinel agent 322 and a user graphical user interface (GUI) 326.

The mission component 302 may represent a human action required to perform a mission. The mission component 302 may also represent a system required to perform the mission. For example, a system may be a communications device. In another example, the system may be a radar system. In a further example, a system may be a vehicle. In some examples, the mission component 302 may be a hybrid of a system and a human action. The mission component 302 may be an actual human action or an actual system or be a simulated human action or a simulated system.

In some examples, mission components 302 such as a simulated human action or a simulated system may be represented by a software agent. The software agent is an autonomous software component. The software agent is goal-driven as opposed to procedure-driven. The software agent may also be extended to include multiple ways to achieve a goal and may be adaptable.

The intelligent agent 306 integrates a mission component 302 into the AMPS 300. The intelligent agent 306 provides an interface which allows for "plug-n-play" of mission components 302 into the AMPS 300. Since mission components 302 may be either simulated or real, the intelligent agent 306 may provide different functionality depending on the mission components 306 supported by a particular intelligent agent 306.

For example, if a mission component 302 is represented by a simulation or a real entity (human action or system), the intelligent agent 306 registers the entity as a mission component 302 in the metadata database 316. For example, the intelligent agent 306 registers itself (on behalf of the mission component 302) with the simulation's communications infrastructure. For example, the intelligent agent 306 initializes an instance of the messaging infrastructure 312. The messaging infrastructure 312 connects itself with the other instances of the messaging infrastructure 312 and facilitates message communications between the instances. This allows the intelligent agent 306 to monitor messages being transmitted on the communications infrastructure, and it allows the intelligent agent 306 to inject messages into the simulation via the communications infrastructure. The registering of the mission components 302 allows for the dynamic set-up of mission interactive relationships. The intelligent agent 306 may also manage interactions with the simulated or real mission entity by providing input to the simulation such as gathering input data from messages and formatting the input as required by the simulation. The intelligent agent 306 may also receive output from the simulation such as gathering output data from the simulation outputs and formatting and transmitting the output in messages.

In another example, if a mission component 302 is a human action, the intelligent agent 306 integrates the human action in to the AMPS 300 using user interfaces such as a mouse, a game controller and so forth. In a further example, if the mission component 302 is a system, the intelligent agent 306 records and transfers existing messages to and from the system. In a further example, the intelligent agent 306 may be part of a communication layer of the system and provide data and control to it through its interaction with the other intelligent agents 306 that integrate other systems and human action). In this example, the intelligent agent 306 is not using the messaging infrastructure 312 for communications. Instead, the intelligent agent 306 is using some other type of communications layer, such as TCP/IP. This other type of communications layer is separate from the messaging infrastructure 312.

The agent management layer 308 includes agent templates 309 and services 310 such as commonly used services. The agent templates 309 allows for intelligent agents 306 to be generated dynamically during mission execution. The agent template 309 describes the connections provided to the agent behavior. For example, there are various types of behaviors that emulate different human actions. Each behavior is then "plugged and played" into each intelligent agent 306. The agent template 309 allows the "plug-in" of input data. This could be messages from either the messaging infrastructure 312 and/or another communications channel (such as TCP/IP or human interface GUI). The agent template 309 also allows the "plug-in" of behaviors of the intelligent agent 306 to facilitate processing to be done on the input data. The agent template 309 further allows a "plug-in" for output data to be sent from the intelligent agent 306 to either the messaging infrastructure 312/or another communications channel (such as TCP/IP or human interface GUI). Examples of agent templates 309 may include managing communication, monitoring status, generating customized user interfaces and performing common human and system functions.

The agent management layer 308 may also be used to delete intelligent agents 306.

The services 310 allow intelligent agents 306 to locate, communicate and cooperate with other intelligent agents. In some examples, the services 310 are implemented as software agents. In some examples, the agent management layer allows the use of intelligent agents 306 based in a C++ language.

The messaging infrastructure 312 delivers messages between the mission components 302. The messaging infrastructure 312 may also deliver messages between the mission components 302 and the sentinel agent 322 directly or indirectly using the metadata database 316. For example, the sentinel agent 322 receives messages from the message components 302 with the metadata. In another example, the sentinel agent communicates directly with the mission components 302 (e.g., to play an active role in the mission).

The messaging infrastructure 312 utilizes communication models that simulate the behavior of actual communication systems. Lags and losses may be included within the intelligent agent behaviors. For example, if one models the behavior of a telephone switchboard operator and it is determined that the switchboard operator delays each message twenty minutes because the switchboard operator is "slow", the intelligent agent 306 may include the twenty minute delay into the behavior of the intelligent agent 306. Likewise, if a switchboard has a mechanical backend that is used to connect the correct cables together, the intelligent agent 306 may be modeled to include the mechanically induced delays into the behavior of the intelligent agent 306. In other examples, other intelligent agent behaviors may be introduced such as suppressing messages because of lack of line-of-sight between communication devices, administering delays and introducing errors appropriate of mission operating conditions.

In some examples, the messages within the AMPS 300 include a metadata section which includes sender and recipient data, and a data payload section. In one example, the messaging infrastructure 312 is a real-time message delivery system. In some examples, the messaging infrastructure 312 supports extensible mark-up language (XML) messages. In one example, the messaging infrastructure is a Common Operating Environment (COE) developed by Raytheon Company of Waltham Mass., the assignee of the present patent application.

The metadata database 316 includes metadata describing the mission. The metadata database 316 also provides context to the messages received from the mission components 302. Without metadata providing the context, the messages received would have no meaning. The metadata database 316 includes message metadata model 332, mission component description metadata 334 and mission state/transition metadata model 336.

The message metadata model 332 describes the messages used in the mission and defines how mission components communicate with each other. Each item of the message metadata model 332 associated with a message may include fields such as a message identification (ID) field, a message label field, a message content field and a message size field. The ID field includes a unique identifier distinguishing a message from other messages. The message label field identifies the type of message (e.g., a request for support). The message content field includes information to be conveyed. The message size field includes the size of the message.

The message metadata model 332 may also include fields for a priori and static information as well as real-time updates to track messages during mission execution. The message metadata model 332 may further include a field for timestamp information.

The mission component description metadata 334 describes which of the mission components 302 participate in the mission. Each item of the mission component description metadata 334 associated with a mission component 302 may include fields such as a mission component ID field, a mission component name field, a mission component capability field, an address field and a status identifier field. The mission component ID field includes a unique identifier distinguishing the mission component 302 from other mission components. The mission component name field identifies the name or type of mission component 302. The mission component capability field identifies which tasks the mission component 302 is capable of performing. Mission relationship fields identify dependencies with other mission components. The address field includes an address where communications with the mission component 302 should be sent. For example, the address field may contain an Internet Protocol (IP) address. The status field may, for example, indicate whether a mission component is active, inactive or unavailable. The mission component metadata model can contain a priori and static information as well as dynamic recording of the behavior of mission components 302 during mission execution.

The state/transition metadata model 336 defines what and when actions are performed by the mission component 302 during the mission. The state/transition metadata model 336 may include a CPN model of the mission (e.g., an integration mission model described above). The state/transition metadata model 336 may be analyzed for mission assurance and effectiveness before any mission components are simulated or systems built (e.g., using processes in FIGS. 1 to 5). The state/transition can also be used to dynamically verify and validate the execution of a mission. The state transition metadata model 336 will contain a priori and static information as well as dynamic data on the states and transitions of the executing mission.

The metadata database 316 provides dynamic verification of aspects of the mission. For example, by checking the metadata database 316 a user of AMPS 300 may (1) verify that the right mission components 302 are joining the mission, (2) the mission components 302 are interacting as expected and (3) the actions the mission components are performing are correct. Furthermore, together with the intelligent agents 306, metadata database 316 allows for faster and easier data exchange, which equates to real-time system performance simulation. As will be shown below this further equates to more accurate performance monitoring (for system optimization).

The sentinel agent 322 receives mission interactions amongst the mission components 302 through the messaging infrastructure 312. Combined with the metadata from the metadata database 316, the sentinel agent 322 dynamically processes mission performance. For example, the sentinel agent 322 may perform a timing analysis by plotting the sequence of mission events as a function of time inferred from message time stamps. In another example, the sentinel agent may record bandwidth utilization as a function of IP node/communication channel and time. This may be done by actually computing the size of the message or through the use of context-dependent metadata characterization of message content.

In one example, the sentinel agent 322 is an observer of the mission. The sentinel agent 322 is connected to the messaging infrastructure 312. The messaging infrastructure 312 provides a functionality to allow for a specially configured sentinel agent 322 to receive the message traffic. In a further example, the sentinel agent 322 may perform a workload analysis. The workload analysis may infer human workload by processing the data flow between to and from a human. The mission component metadata 334 may be used to estimate the cognitive difficulty of the tasks performed by the human. In a still further example, the sentinel agent 322 may perform a state-space analysis by tracing mission events against an enumerated state-space to verify the validity of the mission execution and to gather statistics to calculate a likelihood of a sequence of events. Since this is a state-based simulation, the sentinel agent 322 tracks the state of the simulation based on the message traffic that is being exchanged across the messaging infrastructure 312. For example, if the sentinel agent 322 flags each time a particular request is denied by a certain intelligent agent 306. The sentinel agent 322 would track of all the particular requests, and then correlate them with denial messages (sent from the particular intelligent agent 306) that it receives from the messaging infrastructure 312.

In other examples, the sentinel agent may be an active participant in the mission.

The user GUI 326 provides a user with a representation of the mission. The user may be a person who is observing, analyzing, controlling the mission or any combination thereof. The user GUI 326 receives from the sentinel agent 322 the messages and the metadata. The mission may be rendered to a user in a number of views with real-time updates. For example, a geographical view provides a physical location of all the mission components 302 in three-dimensions. In another example, a system view provides details about mission components 302 their capabilities, status and so forth. In a further example, a performance view renders graphs depicting mission performance such as timeliness, communication patterns and so forth. In a still further example, a state/transition view depicts the cause and effect relationships among the mission events.

The rendered views may be tailored to suit the needs of the observer. For example, a high level executive may require a summary of the mission. In another example, a mission controller may require further detailed information. The tailoring may be based on the known role of the user and that roles relationship to the mission as described in the mission component description metadata model 334. The tailoring can further be enhanced through learned patterns of interaction between a user and the mission profiling system.

Figure 8:
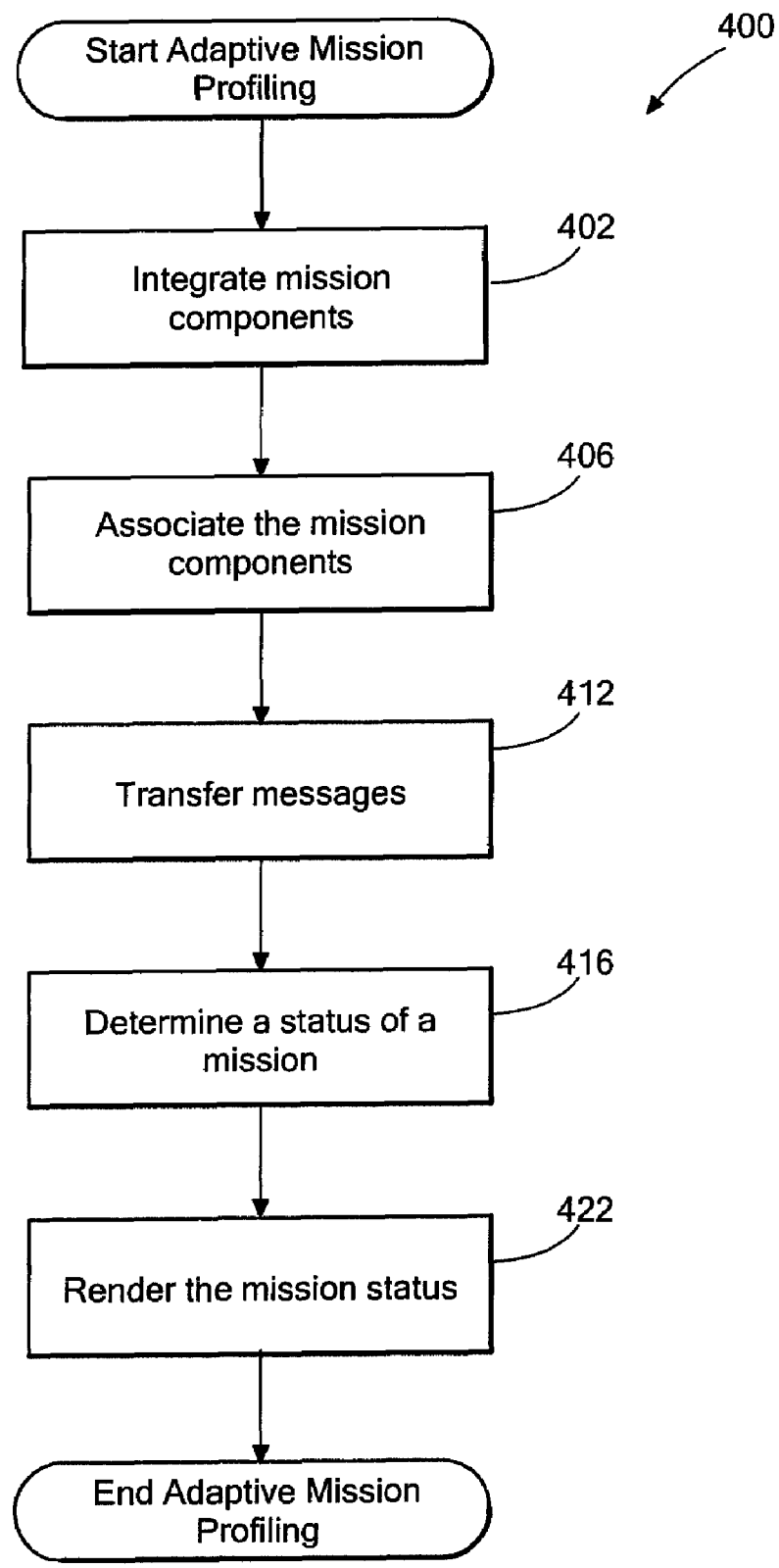
FIG. 8 is a flowchart of a process for adaptive mission profiling.

Referring to FIG. 8, adaptive mission profiling using AMPS 300 may be performed using an exemplary process 400. Process 400 integrates the mission components 302 (402). For example, the mission components 302 are integrated using the intelligent agents 306 linked together by the agent management layer 308 and the messaging infrastructure 312.

Process 400 associates the mission components 302 to the metadata database 316 (406). The metadata in the metadata database 316 determines the mission components 302 that will participate in the mission, the communications between the mission components and the state/transitions model for each mission components (e.g., what each mission component may do and when).

Process 400 transfers the messages (412). For example, messages are transferred between the message components 302. Messages are also received by the sentinel agent 322. In some examples, the sentinel agent 322 may participate in the mission by communicating directly with the mission components 302.

Process 400 determines a status of the mission (416). For example, the sentinel agent 322 receives messages from the messaging infrastructure 312 and with the context provided by the metadata determines a status of the mission. The status may include but is not limited to past, present and predicted performance, efficiency, timeliness and so forth. Process 400 renders the status of the mission (422). For example, user GUI 326 renders the status of the mission on a display (not shown). The rendered status may be tailored to a user.

Figure 9:
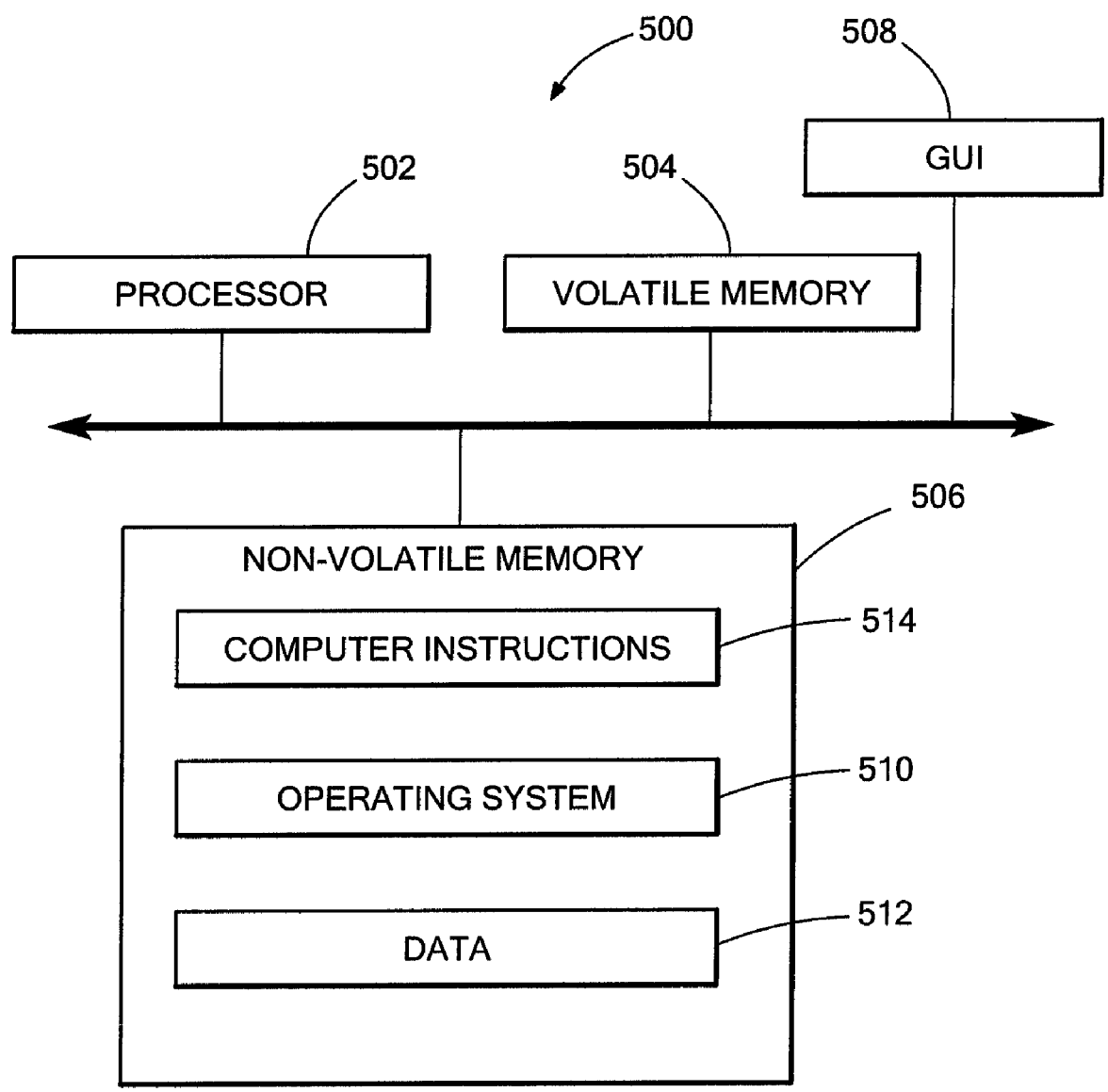
FIG. 9 is a block diagram of a computer system on which the process of FIG. 8 may be implemented.

FIG. 9 shows an exemplary computer 500 for which AMPS 300 may be embodied to perform process 400. Computer 500 includes a processor 502, a volatile memory 504, a non-volatile memory 506 (e.g., a hard disk) and a GUI 508. Non-volatile memory 506 stores operating system 510, data 512 for the mission, and computer instructions 514, which are executed by processor 502 out of memory 504 to execute process 400. In other examples, adaptive mission profiling may be enacted on multiple computers connected by a network.

Process 400 is not limited to use with the hardware and software of FIG. 9; it may find applicability in any manual, visual or computing or processing environment and with any type of medium or machine that is capable of running the models or a computer program. Process 400 may be implemented in hardware, software, or a combination of the two. Process 400 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the integrated mission module and to generate output information.

Process 400 may be implemented, at least in part, via any computer program product, i.e., a computer program tangibly embodied, e.g., in a machine-readable storage device, for execution by, or to control the operation of, data processing apparatus, e.g., a programmable processor, a computer, or multiple computers. Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the integrated mission module.

Process 400 may be performed by one or more programmable processors executing one or more computer programs to perform the functions of the system. All or part of the system may be implemented as, special purpose logic circuitry, e.g., an FPGA (field programmable gate array) and/or an ASIC (application-specific integrated circuit).

The processes described herein are not limited to the specific embodiments described herein. For example, the processes are not limited to the specific processing order of FIGS. 1 to 5 and 8. Rather, any of the blocks of FIGS. 1 to 5 and 8 may be re-ordered, combined, repeated or removed, performed in series or performed in parallel, as necessary, to achieve the results set forth above.

A mission may apply to a number of scenarios. In one example, a mission may apply to a wartime scenario. In another example, the mission may apply to natural disasters such as preparation and relief. In another example, the mission may apply to operations of a company.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A computer implemented method to profile a mission, comprising:

integrating mission components in a computer system;

associating the mission components to metadata stored in a database in a memory of the computer system;

defining in the metadata, using the computer system, at least two mission components to participate in the mission;

defining in the metadata, using the computer system, functionality of the at least two mission components during the mission;

defining in the metadata, using the computer system, communications between the at least two mission components during the mission;

transferring, using the computer system, messages from the at least two mission components during the mission;

monitoring the messages, using the computer system; and
determining, using the computer system, a status of the
mission based on the messages and the metadata.

2. The method of claim 1 wherein transferring messages from the at least two mission components comprises receiving messages from an agent connected to the at least two mission components.

3. The method of claim 1 wherein associating the mission components comprises dynamically associating the mission components.

4. The method of claim 1 wherein integrating mission components comprises integrating mission components comprising behaviors and wherein associating the mission components comprises associating the behaviors of the mission components.

5. The method of claim 1 wherein transferring messages comprises transferring messages from the at least two mission components while simulating realistic communication.

6. The method of claim 1 wherein determining a status comprises determining in real-time a status of the mission.

7. The method of claim 1 wherein determining a status of the mission comprises interpreting the mission.

8. The method of claim 1 wherein integrating the mission components comprises integrating a human action.

9. The method of claim 8 wherein integrating the mission components comprises integrating simulated human behavior.

10. The method of claim 1 wherein integrating the mission components comprises integrating a system used in the mission.

11. The method of claim 10 wherein integrating the system comprises integrating a simulated system.

12. The method of claim 10 wherein integrating the system comprises integrating a system having portions that are simulated.

13. The method of claim 1 wherein associating the mission components to metadata comprises associating the mission components to a message model.

14. The method of claim 1 wherein associating the mission components to metadata comprises associating the mission components to a mission component description.

15. The method of claim 1 wherein associating the mission components to metadata comprises associating the mission components to a state transition model.

16. The method of claim 1 wherein determining a status comprises analyzing the mission based on the metadata.

17. The method of claim 1 wherein determining a status comprises performing an analysis on the mission.

18. The method of claim 1, further comprising tailoring the status to a user.

19. An apparatus to profile a mission, comprising:
   circuitry to integrate mission components in a computer system;
   circuitry to associate the mission components to metadata stored in a database in a memory of the computer system, the metadata defining:
      at least two mission components to participate in the mission,
      functionality of the at least two mission components during the mission; and
      communications between the at least two mission components during the mission;
   circuitry to transfer messages from the at least two mission components during the mission;
   circuitry to monitor the messages; and
   circuitry to determine a status of the mission based on the messages and the metadata.

20. The apparatus of claim 19 wherein the circuitry comprises at least one of a processor, a memory, programmable logic circuitry and logic gates.

21. The apparatus of claim 19 wherein the mission components include behaviors and wherein the circuitry to associate the mission components comprises circuitry to associate the behaviors of the mission components.

22. The apparatus of claim 19 wherein the circuitry to integrate the mission components comprises circuitry to integrate a human action.

23. The apparatus of claim 19 wherein the circuitry to integrate the mission components comprises circuitry to integrate a system used in the mission.

24. The apparatus of claim 19 wherein the circuitry to determine a status comprises circuitry to perform an analysis on the mission.

25. The apparatus of claim 19, further comprising circuitry to tailor the status to a user.

26. An article comprising a computer-readable medium storing computer executable instructions that when executed on a computer system perform a method to profile a mission, the medium comprising instructions for:
   integrating mission components in the computer system;
   associating the mission components to metadata stored in a database in a memory of the computer system;
   defining in the metadata at least two mission components to participate in the mission;
   defining in the metadata functionality of the at least two mission components during the mission;
   defining in the metadata communications between the at least two mission components during the mission;
   transferring messages from the at least two mission components during the mission;
   monitoring the messages; and
   determining a status of the mission based on the messages and the metadata.

27. The article of claim 26 wherein the mission components include behaviors and wherein the instructions causing the machine to associate the mission components comprises instructions causing the machine to associate the behaviors of the mission components.

28. The article of claim 26 wherein the instructions causing the machine to integrate the mission components comprises instructions causing the machine to integrate a human action.

29. The article of claim 26 wherein the instructions causing the machine to integrate the mission components comprises instructions causing the machine to integrate a system used in the mission.

30. The article of claim 26 wherein the instructions causing the machine to determine a status comprises instructions causing the machine to perform an analysis on the mission.

31. The article of claim 26, further comprising instructions causing the machine to tailor the status to a user.

32. An adaptive mission profiler system implemented on a computer system to profile a mission, comprising:
   a memory storing a metadata database comprising metadata, the metadata defining:
      at least two mission components to participate in the mission,
      functionality of the at least two mission components during the mission; and
      communications between the at least two mission components during the mission;
   a messaging infrastructure implemented in the computer system and configured to receive messages from mission components during the mission;
   an intelligent agent configured to:

integrate the mission components to the messaging infrastructure; and simulate realistic communication of messages between the mission components and the messaging infrastructure; and a sentinel agent implemented in the computer system and configured to:

receive messages from the mission components; and determine in real-time a status of the mission based on the messages and the metadata.

33. The system of claim 32, further comprising an agent management layer coupled to the messaging infrastructure and the intelligent agent, the agent management layer comprising an agent template configured to allow dynamic generation of additional intelligent agents during the mission.

34. The system of claim 32 wherein the metadata comprises:

a message metadata model to define the messages used in the mission; and a mission state transition metadata model to define actions to be performed by the at least two mission components and timing of the actions.

* * * * *

UNITED STATES PATENT AND TRADEMARK OFFICE
CERTIFICATE OF CORRECTION

PATENT NO. : 7,580,819 B2  
APPLICATION NO. : 11/392222  
DATED : August 25, 2009  
INVENTOR(S) : De et al.

It is certified that error appears in the above-identified patent and that said Letters Patent is hereby corrected as shown below:

Col. 3, line 34, delete "has" and replace with -- as --.

Col. 4, line 2, delete "a" and replace with -- as --.

Col. 5, line 12, delete "systems" and replace with -- system --.

Col. 5, line 51, delete ". Subprocess process 40" and replace with -- . Subprocess 40 --.

Col. 5, line 57, delete "may found" and replace with -- may be found --.

Col. 6, line 14, delete "module" and replace with -- model --.

Col. 6, line 16, delete "module" and replace with -- model --.

Col. 6, line 17, delete "module" and replace with -- model --.

Col. 6, line 18-19, delete "module." and replace with -- model. --.

Col. 6, line 19, delete ". Subprocess process 60" and replace with -- . Subprocess 60 --.

Col. 6, line 24-25, delete "deficiency" and replace with -- deficiency. --.

Col. 6, line 25, delete "module" and replace with -- model --.

Col. 6, line 28, delete "that that the" and replace with -- that the --.

Col. 6, line 34, delete "module," and replace with -- model, --.

Col. 6, line 41, delete "module" and replace with -- model --.

Col. 6, line 44, delete "module" and replace with -- model --.

Col. 6, line 51, delete "module" and replace with -- model --.

Col. 6, line 67, delete "systems" and replace with -- system --.

Col. 7, line 29, delete "though" and replace with -- through --.

UNITED STATES PATENT AND TRADEMARK OFFICE
CERTIFICATE OF CORRECTION

PATENT NO. : 7,580,819 B2
APPLICATION NO. : 11/392222
DATED : August 25, 2009
INVENTOR(S) : De et al.

It is certified that error appears in the above-identified patent and that said Letters Patent is hereby corrected as shown below:

Col. 8, line 5, delete "module," and replace with -- model, --.

Col. 8, line 8, delete "module." and replace with -- model. --.

Col. 8, line 11, delete "module" and replace with -- model --.

Col. 8, line 16, delete "module" and replace with -- model --.

Col. 8, line 17, delete "module" and replace with -- model --.

Col. 8, line 25, delete "module" and replace with -- model --.

Col. 8, line 26, delete "module" and replace with -- model --.

Col. 8, line 37, delete "module," and replace with -- model, --.

Col. 8, line 47-48, delete "module" and replace with -- model --.

Col. 8, line 49, delete "module" and replace with -- model --.

Col. 9, line 13, delete "user graphical user" and replace with -- graphical user --.

Col. 9, line 65, delete "in to" and replace with -- into --.

Col. 10, line 6, delete "action)." and replace with -- action. --.

Col. 10, line 16, delete "template" and replace with -- templates --.

Col. 10, line 20, delete "template" and replace with -- templates --.

Col. 10, line 26, delete "template" and replace with -- templates --.

Col. 10, line 28, delete "312/or" and replace with -- 312 or --.

Col. 10, line 48-49, delete "sentinel agent" and replace with -- sentinel agent 322 --.

Col. 12, line 23, delete "sentinel agent" and replace with -- sentinel agent 322 --.

UNITED STATES PATENT AND TRADEMARK OFFICE
CERTIFICATE OF CORRECTION

PATENT NO. : 7,580,819 B2
APPLICATION NO. : 11/392222
DATED : August 25, 2009
INVENTOR(S) : De et al.

It is certified that error appears in the above-identified patent and that said Letters Patent is hereby corrected as shown below:

Col. 12, line 48, delete "intelligent agent 306. The" and replace with -- intelligent agent 306, the --.

Col. 12, line 49, delete "track of all" and replace with -- track all of --.

Col. 12, line 64, delete "mission components 302 their capabilities," and replace with -- mission components 302 and their capabilities, --.

Col. 13, line 7, delete "roles" and replace with -- role's --.

Col. 13, line 64, delete "module" and replace with -- model --.

Col. 14, line 20, delete "module." and replace with -- model. --.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,580,819 B2  Page 1 of 1
APPLICATION NO. : 11/392222
DATED : August 25, 2009
INVENTOR(S) : De et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 575 days.

Signed and Sealed this

Fourteenth Day of September, 2010

David J. Kappos
*Director of the United States Patent and Trademark Office*